United States Patent [19]
Sroka et al.

[11] Patent Number: 5,590,411
[45] Date of Patent: Dec. 31, 1996

[54] METHOD AND APPARATUS FOR SUPPRESSING SPURIOUS THIRD-ORDER RESPONSES IN TRANSCEIVERS

[75] Inventors: Peter Sroka, West End; Peter D. Harrison, Ascot, both of England

[73] Assignee: Nokia Mobile Phones Ltd., Finland

[21] Appl. No.: 371,027

[22] Filed: Jan. 10, 1995

[51] Int. Cl.$^6$ .................................................. H04B 1/10
[52] U.S. Cl. ......................... 455/78; 455/295; 455/296; 370/278
[58] Field of Search ...................... 455/24, 69, 78, 455/79, 80, 84, 295, 296, 311, 239.1, 250.1, 283, 289, 291, 293; 370/32, 32.1

[56] References Cited

U.S. PATENT DOCUMENTS

| | | |
|---|---|---|
| 4,637,073 | 1/1987 | Selin et al. ................................ 455/80 |
| 5,212,815 | 5/1993 | Schumacher .............................. 455/80 |
| 5,239,686 | 8/1993 | Downey ..................................... 455/78 |
| 5,428,824 | 6/1995 | Kasai ........................................ 455/311 |

FOREIGN PATENT DOCUMENTS 5-315994  11/1993  Japan ........................................ 455/78

*Primary Examiner*—Chi H. Pham
*Attorney, Agent, or Firm*—Perman & Green

[57] ABSTRACT

Apparatus and a method for inhibiting spurious responses in the receiver stage of a radio telephone are disclosed. A detector detects the transmission of an RF signal from the transceiver and sends a control signal indicative of such transmission to a linearity controller. The linearity controller is coupled to non-linear devices in the receiver stage of a transceiver and varies the linearity of the non-linear devices in accordance with the control signal. Preferably, the linearity is varied by increasing the bias current or voltage for the non-linear devices when the control signal indicates transmission of an RF signal.

13 Claims, 3 Drawing Sheets

AMPLIFIER IMPLEMENTATION
WITH CURRENT
BOOSTING CIRCUIT.

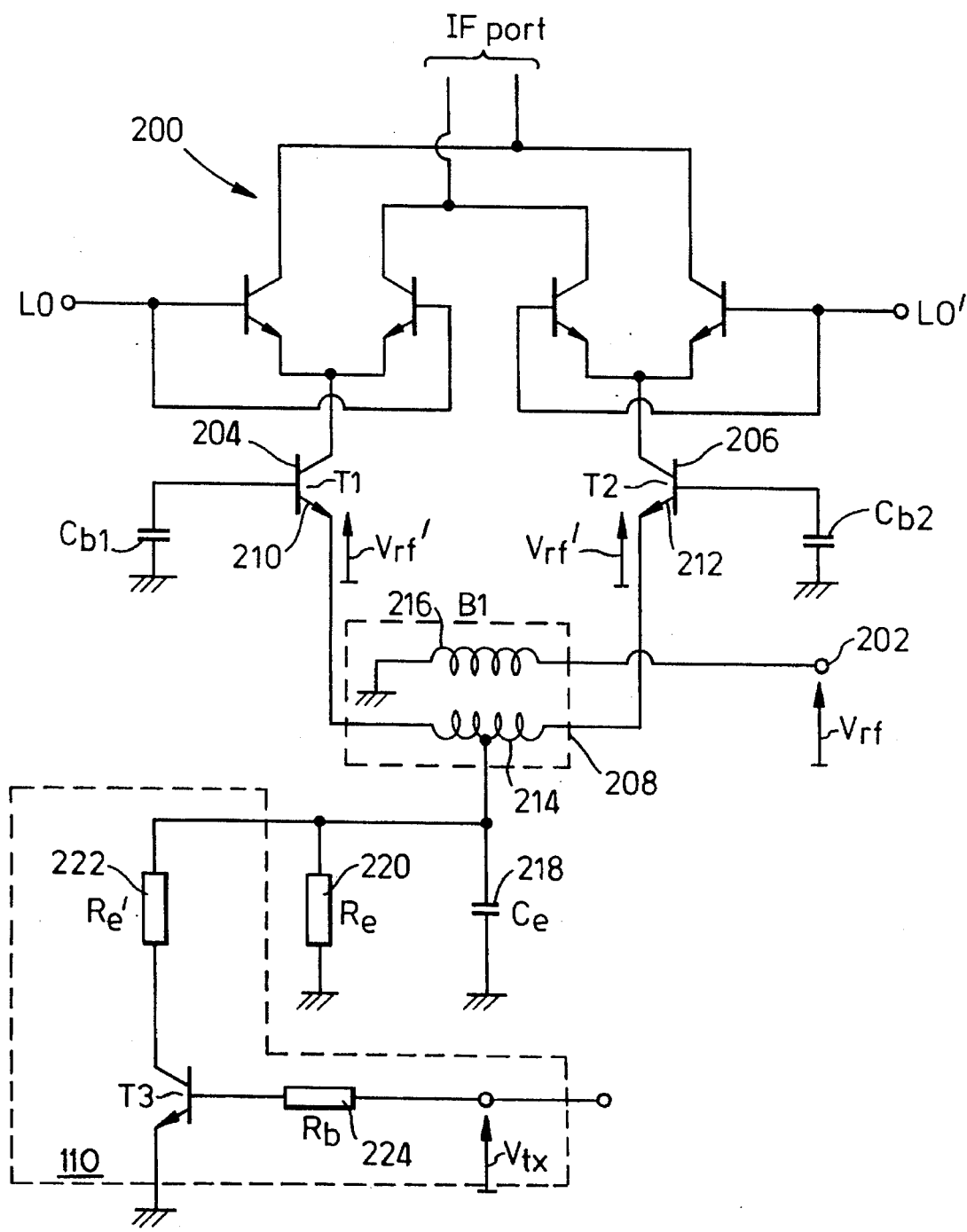
Fig.2. MIXER IMPLEMENTATION WITH CURRENT BOOSTING CIRCUIT.

METHOD AND APPARATUS FOR SUPPRESSING SPURIOUS THIRD-ORDER RESPONSES IN TRANSCEIVERS

FIELD OF THE INVENTION

The present invention relates to radio telephone apparatus, in particular to apparatus for inhibiting spurious responses in a radio telephone receiver.

BACKGROUND OF THE INVENTION

Known cellular radio telephone networks such as those conforming to the American Mobile Phone System (AMPS), the Enhanced Total Access Communication System (ETACS) and the Nordic Mobile Telephone System (NMT) specifications, employ Frequency-Division Duplex (FDD) operation. In a system using FDD both the receiver and transmitter of a radio telephone's transceiver are required to be capable of operating simultaneously. Known radio telephone networks operate at a band of frequencies around 900 MHz. The duplex frequency separation between receive and transmit signals is 45 MHz and the total bandwidth for receive and transmit bands is 25 MHz for NMT and AMF'S systems, and 33 MHz for the ETACS system.

An important aspect of the design of a receiver for a radio telephone is the rejection of spurious responses, many of which originate from the non-linear elements comprising the RF stage of the receiver. Since the receiver has to be capable of detecting and processing low power signals, down to −113 dBm (ETACS, NMT) and −116 dBm (AMPS), spurious signals which typically are also low power but higher power than the desired receive signals have a noticeable effect in the receiver. For heterodyne receivers the spectral location, mechanism and rejection of spurious responses is known to the person skilled in the art in transceivers operating in a FDD system as described above, such as the transceiver 100 shown in FIG. 1a, there can be additional spurious responses caused by the presence of a transmit signal from the transceiver during signal reception by the receiver 102. The additional spurious responses are caused by a portion (e.g. −13 dBm) of the high transmit power leaking through the transceiver duplexer 104 into the receiver 102.

One such response is the so-called "half-duplex response". This is generated by signals which lie spectrally mid-way between the receive (Rx) and transmit (Tx) channels (half duplex signals) intermodulating with leaked transmit signals in the receiver's amplifier and mixer to create an interference signal or spurious response at the receive channel frequency. The half-duplex response is caused by third order non-linearities in the front end of RF amplifying and mixing stages of the receiver.

If the receiver is designed to provide half-duplex response rejection, then extra transmit rejection from the receive filters, or a higher third order intercept point (i.e. greater linearity) are required in the non-linear devices or both. This results in larger, more expensive transceivers since more filters and/or tunable filters which take up greater space are required for higher filter rejection requirements, or reduced standby battery time since greater current input power (LO power) or higher voltages are required to give higher amplifier and mixer linearity.

BRIEF SUMMARY OF THE INVENTION

In a first aspect of the present invention there is provided apparatus for inhibiting spurious responses in a receiver section of a transceiver comprising detection means for detecting transmission of a RF signal from the transceiver and outputting a control signal indicative of said transmission to a linearity control means, said linearity control means being adapted to couple to a non-linear device disposed in a receiver and to vary the linearity of said non-linear device in accordance with said control signal and in a second aspect of the present invention there is provided a transceiver for a radio telephone comprising a transmitting means for transmitting a first RF frequency, a receiving means for receiving a second RF frequency, and a duplexor coupled to the transmitting and receiving means, adapted to inhibit ingress of said first RF frequency into the receiving means, wherein said receiving means includes a non-linear device for operating on the second RF frequency and adapted to have increased linearity during transmission of said first RF frequency from the transmitting means.

In a third aspect of the present invention there is provided a method for inhibiting spurious responses in a receiver of a transceiver, comprising increasing the linearity of a non-linear device disposed in the receiver and operating on received signals during transmission of signals from said transceiver.

An advantage of the present invention is that the third order intercept point for the non-linear devices in the receiver can be increased when the transceiver transmits a signal, thereby inhibiting the half-duplex response. Increasing the intercept point in a manner in accordance with the invention also has the advantage that the half-duplex response can be inhibited without the need for extra filters or tunable filters and allows receive filters with lower transmit rejection specification than would otherwise be required, thereby reducing size, weight and cost of transceivers comprising the invention.

In a preferred embodiment in accordance with the invention said linearity is varied by varying a bias current for said non-linear device in accordance with said control signal. Optionally, said linearity is varied by varying a bias voltage for said non-linear device in accordance with said control signal. For an embodiment comprising a mixer said linearity is varied by varying a drive power of a local oscillator signal for said non-linear device in accordance with said control signal. These have the advantage that they are convenient and relatively straightforward ways in which to achieve increased linearity and intercept pont, and the fact that they consume power is relatively insignificant because they are only operational during transmission of a signal. Any extra power that is drawn by the embodiments has little effect for example on the battery power of a portable radio telephone since the extra power drawn is a very small percentage of the power drawn by the transmitter stages.

Preferably, said linearity control means comprises a selectable resistance disposed in series with said bias current, which varies the bias current flowing through the non-linear device. The selectable resistance may advantageously comprise a first resistor and a second resistor switchably coupled in parallel with said first resistor.

BRIEF DESCRIPTION OF THE DRAWINGS

FIG. 2 is a circuit diagram for an embodiment in accordance with the invention applied to a mixer circuit.

DETAILED DESCRIPTION OF THE EMBODIMENTS OF THE INVENTION

Figure 1A:
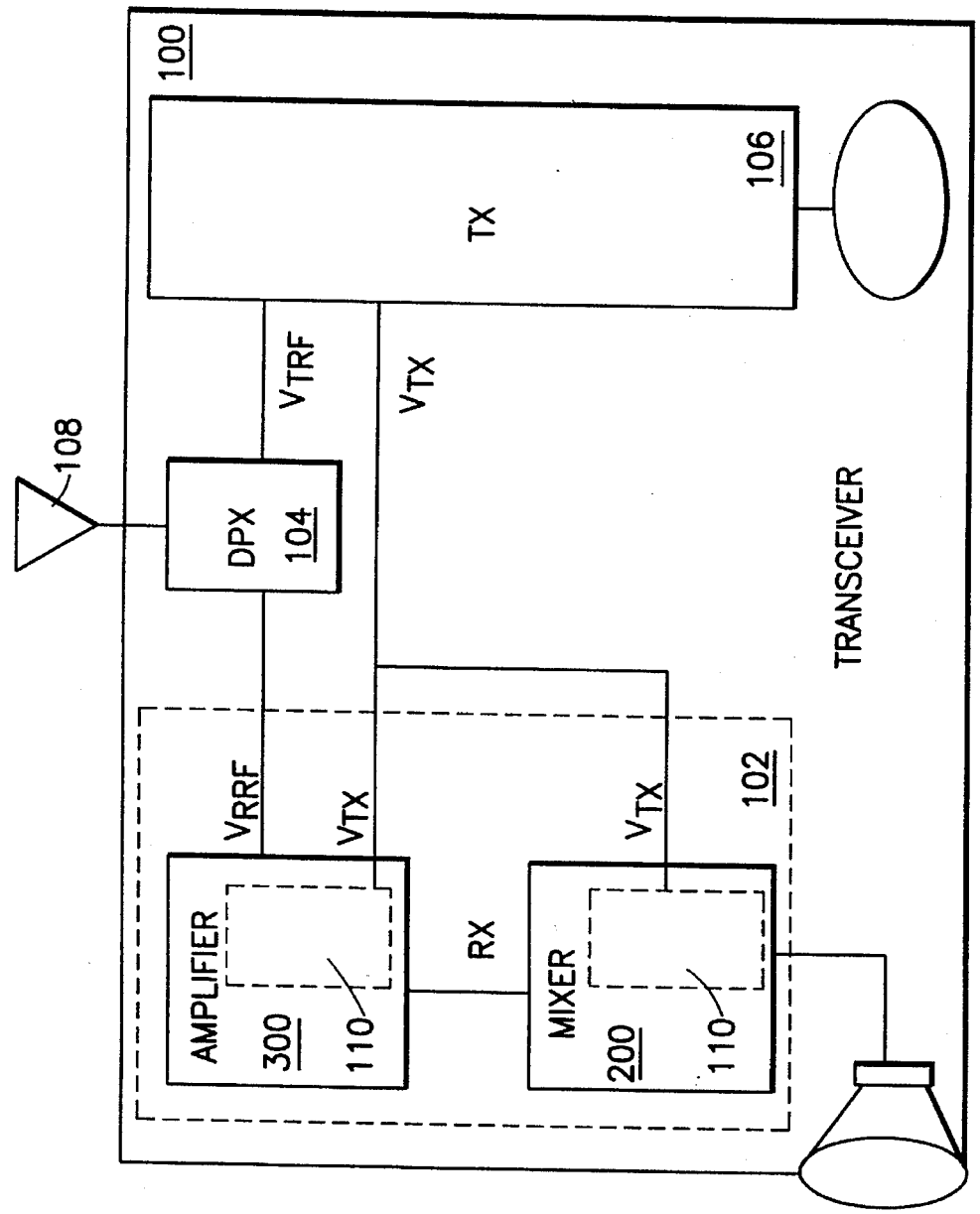
FIG. 1a is a block diagram of a transceiver in accordance with the present invention.
Figure 1B:
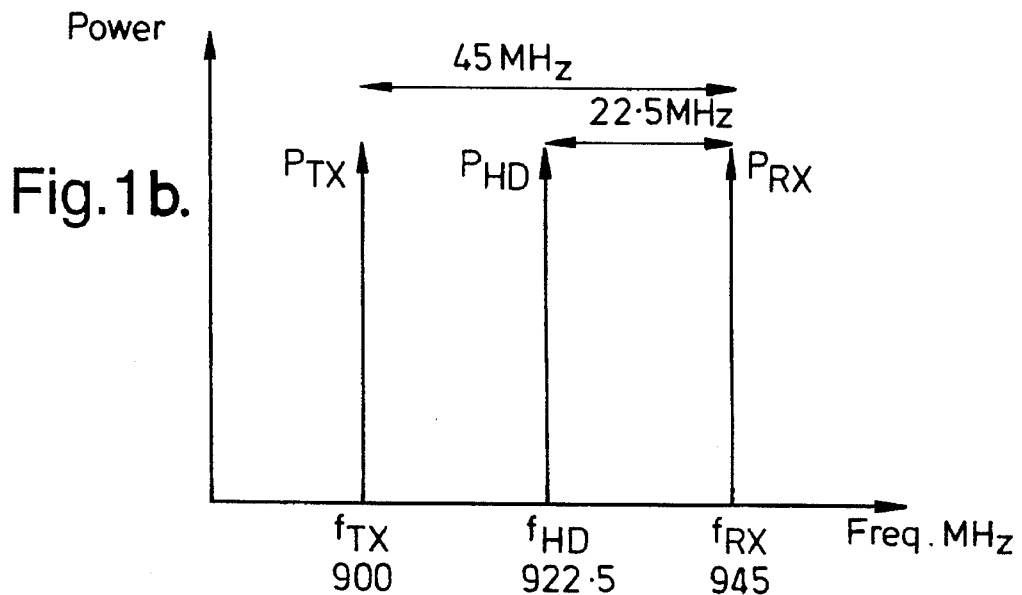
FIG. 1b shows the spectral relationship between the transmit frequency ($f_{TX}$), half-duplex frequency ($f_{HD}$) and the receive frequency ($f_{RX}$)

In the above-described FDD system, the half duplex signal lies between the Tx and Rx channels at a frequency separation of 22.5 MHz from the Tx and Rx channels. Since, the actual Tx and Rx channel frequencies can vary, the absolute spectral location of the half-duplex signal also varies and thus cannot easily be filtered for all possible Tx and Rx channel locations other than by tunable filters. A schematic diagram showing the spectral relationship between the Tx signal, half-duplex signal ($f_{HD}$) and Rx signal is shown in FIG. 1. Although the respective signal power levels, $P_{TX}$, $P_{HD}$ and $P_{RX}$ are shown equal, this is not necessarily or usually the case. Clearly, a modulation product which satisfies 2 $f_{HD}=f_{RX}$.

The half-duplex response can be shown to fall at the Rx frequency by the following analysis. The transfer response of a non-linear device can be represented mathematically as a polynominal as shown in equation (1), $$V_o=G_1(V_{TX}+V_{HD})+G_2(V_{TX}+V_{HD})^2+G_3(V_{TX}+V_{HD})^3 \tag{1}$$

where $V_o$ is the output voltage, $G_n$ is the gain for respective non-linearity orders, $V_{TX}$ is the transmit signal and $V_{HD}$ is half-duplex signal. As mentioned earlier, the half-duplex response is caused by 3rd order linearities, and by expanding the cubic term of equation (1) the following is obtained;

$$(V_{TX}+V_{HD})^3=V_{TX}^3+3V_{TX}^2 V_{HD}+3V_{TX} V_{HD}^2+V_{HD}^3 \tag{2}$$

Clearly, only the centre two terms represent intermodulation of the Tx signal ($V_{TX}$) and half-duplex signal ($V_{HD}$). Making $$V_{TX}=v_{TX} \sin\omega_1 t, \text{ and} \tag{3}$$

$$V_{HD}=V_{HD} \sin\omega_2 t, \tag{4}$$

and expanding the centre two terms of equation (2) the following is obtained:

$$3v_{TX}^2 v_{HD} (\sin\omega_1 t)^2 \sin\omega_2 \omega_2 t + 3v_{TX} v_{HD}^2 \sin\omega_1 t (\sin\omega_2 t)^2 \tag{5}$$

Trigonometrically equation (5) can be represented as;

$$3v_{TX}^2 v_{HD} \tfrac{1}{2} \{1-\cos 2\omega_1 t\}\sin\omega_2 t+3v_{TX} v_{HD}^2 \tfrac{1}{2} \{1-\cos 2\omega_2 t\}\sin\omega_1 t. \tag{6}$$

Taking only terms involving products of $\omega_1$ and $\omega_2$ and ignoring constants we have $$\cos 2\omega_1 t.\sin\omega_2 t + \cos 2\omega_2 t \sin\omega_1 t, \tag{7}$$

which by half angle theorems can be represented as, $$\sin(\omega_2 t-2\omega_1 t)+\sin(\omega_2 t+2\omega_1 t)+\sin(\omega_1 t-2\omega_2 t)+\sin(\omega_1 t+2\omega_2 t), \tag{8}$$

again ignoring constants. As can be seen from the third term of equation (8), there is a response at the image frequency ($\omega_1 t-2\omega_2 t$) of the Rx channel thereby creating a spurious response at the Rx frequency. The spurious response corresponds to a signal having an inverted amplitude at a frequency of $2\omega_2 t-\Omega_1 t$.

The power level of the half duplex response can be derived from the following analysis. Let the power level in dBm of the transmit signal incident at the input of a non-linear device be $P_{TX}$ and the power of the half-duplex signal be $P_{Hd}$, with a receive signal power of $P_{HX}$. In practice, $P_{TX}$ and $P_{Hd}$ are generally not necessarily of equal amplitude (typically for a cellular handportable $P_{TX}=-13$ dBm, $P_{Hd}=-41$ dBm and $P_{RX}=-106$ dBm).

To simplify the analysis it is convenient for the $P_{TX}$ and $P_{HD}$ levels to be treated as having equal amplitudes. These altered amplitudes are derived from a weighted average of the two original unequal signal amplitudes in a manner known to a person skilled in the art.

The equivalent levels of the two interfering signals, i.e. $P_{TX}$ and $P_{HD}$, at equal amplitude are given by $(2*P_{TX}+P_{Hd})/3$, where it is assumed that $P_{TX}>P_{Hd}$. If the input referred third order intercept point of the non-linear device is 1, then the resulting third order term lying at the same frequency as $P_{RX}$ is given by $$-2*1+3*(2*P_{TX}+P_{Hd})/3 \text{ or } -2*1+2*P_{TX}+P_{Hd} \tag{9}$$

referred to the input of the non-linear device, i.e. no gain term.

By reducing the non-linearly, i.e. increasing the linearity, of devices in the receive (e.g. amplifiers and mixers) then the non-linear effects are also reduced. A convenient reference point for measuring the linearity of a device is the intercept point and in the present case it is the third order-intercept point which is of particular interest.

By raising the intercept point of the amplifier or mixer equation (9) shows that the additional requirement imposed by the half-duplex response on the receive filter's transmit rejection can be relaxed. From the above analysis, it can be seen that for a 1 dB increase in the intercept point, a corresponding 2 dB improvement in half-duplex rejection is achieved, or a 1 dB relaxation in the $P_{TX}$ rejection of the front-end Rx filters is achieved, or a mixture of the two. An increase in the intercept point can be achieved by a circuit 11D increasing the bias current through the devices, increasing the bias voltage across the devices or in the case of a mixer only, increasing the LO power input to the mixer. All of these consume more power and in the case of a portable radio telephone this is highly undesirable. However, since the extra linearity is only required during transmission of signals from the transceiver, then increasing the intercept point has negligible effect on, e.g. the standby time and the talk time of a portable radio telephone, since the transmitter stages draw more dc power than the mixer.

FIG. 2 shows an embodiment in accordance with the invention implemented in a mixer circuit. In FIG. 2 the technique of increasing the bias current in an active Gilbert cell-type mixer is shown. The same technique can be applied to all active mixers. Since passive mixers generally do not draw dc power, the only option for such mixers is to increase the amount of LO drive power at the LO port.

Although a complete schematic of a Gilbert cell-type mixer is shown in FIG. 2, only that part pertinent to the present invention, i.e. comprising transistors T1 and T2, the balun 208 and circuitry coupled to transistor T3 will be described in detail.

In the embodiment shown in FIG. 2, the mixer 200 is operated in common base mode, to present a relatively low impedance at its RF port 202. The bases 204, 206 of the two transistors T1 and T2 are RF grounded by capacitors $C_{b1}$ and $C_{b2}$. This eases the design of the matching network to the preceding stage.

A single-ended RF voltage $V_{rf}$ is applied through the RF balun B1 208 to appear as two anti-phase voltages $-V_{rf}'$ and $V_{rf}'$ at the emitters 210, 212 of the two transistors T1 and T2. The RF balun 208, comprises a centre tapped winding 214 to provide a balanced port and an end grounded winding 216 to which the single ended RF voltage $V_{rf}$ is input. The balanced port 214 of the balun 208 is also used to provide a dc return path for the mixer 200 dc bias current. The capacitor $C_c$ 218 provides a low RF impedance load to ground at the electrical centre of the balanced winding 214, ensuring that the centre of the winding is grounded to RF signals. The resistor $R_a$ 220 defines the amount of current drawn by the whole mixer structure, and therefore the linearity of the mixer 200.

As analyzed above, the specific linearity parameter that is of interest for half-duplex rejection is the mixer's third order intercept point. This may be dependent on the current flowing through the transistors T1 and T2 and therefore the resistor $R_a$ defines the half-duplex rejection of the mixer. Reducing the value of $R_a$ applies more bias current to the mixer's transistors T1 and T2, and therefore increases the linearity and hence half-duplex rejection of the mixer 200.

The circuit of $R_a'$ 222, T3 and $R_b$ 224 acts as a resistive switch, controlled by the state of transistor T3 in the following ways:

When a transceiver comprising the mixer 200 is operating in standby mode, with the transmitter switched off, $V_{TX}$ which is coupled to T3 via resistor $R_b$ 224 is arranged to be low. This ensures transistor T3 is switched off, and the resistance to ground from the emitters of transistors T1 and T2 is equal to $R_a$ 220. The signal $V_{TX}$ may be sent by a microprocessor unit which controls operation of the radio telephone including the transmission of RF signals.

When the transmitter is operating, i.e. transmitting a signal, the voltage $V_{TX}$ is arranged to be high, and therefore T3 is switched into its conducting state. This connects $R_a'$ 222 in parallel with $R_o$ 220 and therefore increases the mixer bias current in the approximate ratio $(R_a'+R_c)/R_a'$. This then raises the mixer's third order intercept point by the same approximate ratio, and hence its rejection to the half-duplex response by twice the value of this ratio, (by equation (9)).

This linearity boosting scheme can also be used in the receiver's front-end amplifier, since this device is also capable of third order intermodulation and can, therefore, degrade half-duplex response rejection.

Figure 3:
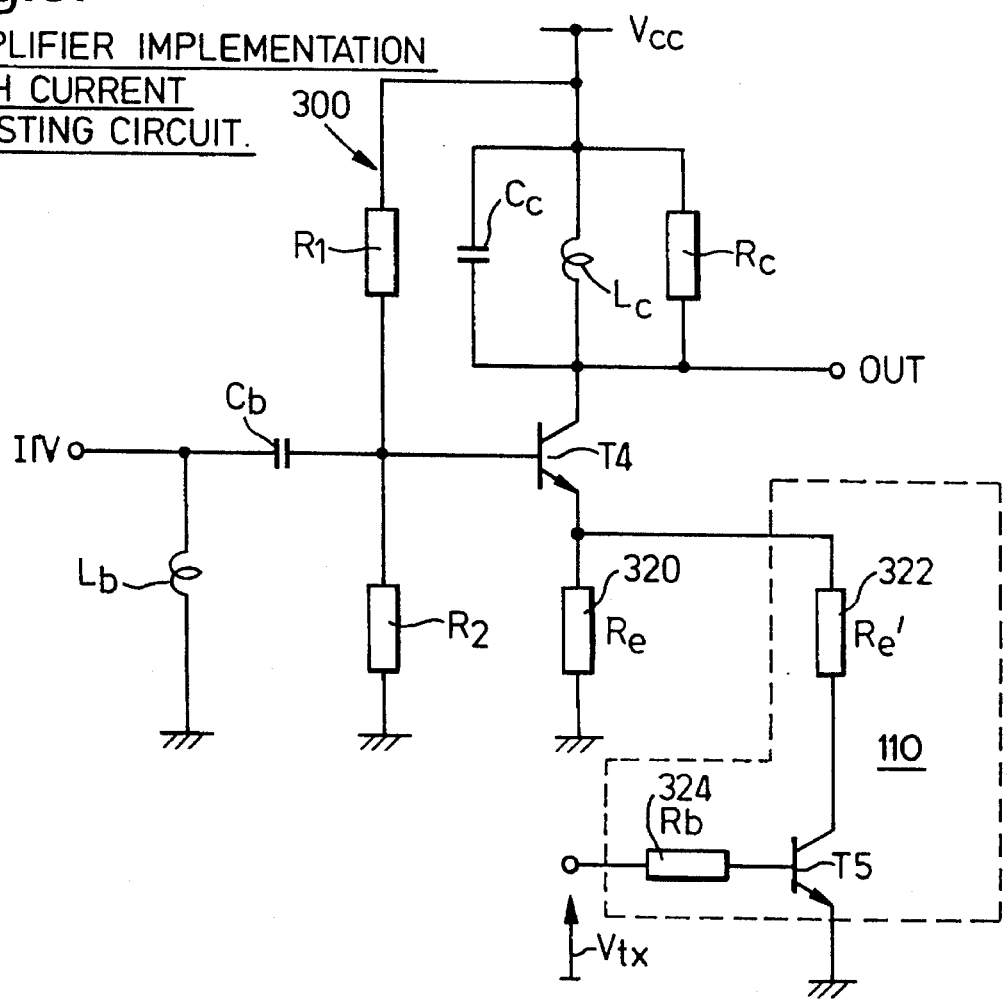
FIG. 3 is a circuit diagram for an embodiment in accordance with the invention applied to an amplifier circuit.

FIG. 3 shows such an amplifier implementation comprising a transistor T4 and conventional biassing components, with the bias current being determined by the value of $R_a$ 300. In the same way as in the mixer shown in FIG. 2, when the transmitter is switched off, the voltage $V_{tx}$ is low and the transistor T5 is switched off. The amplifier bias current, and hence its third order intercept, is then set by $R_a$ 320 only.

When the transmitter is operating, $V_{TX}$ 322 is arranged to go high, thus switching T5 on. This connects $R_a'$ in parallel to ground across $R_a$ 320, and increases the amplifier's bias current. Therefore the amplifier's intercept point is raised, producing a corresponding increase in its rejection of the half-duplex response.

Either the mixer or front-end amplifier stages respectively shown in FIGS. 2 and 3, or both, can be current boosted in this way to improve the rejection of the half-duplex spurious response, maintain standby time, or reduce the size, weight, cost of the receive filters, or any combination of these.

Thus, embodiments in accordance with the invention can increase the linearity of the receiver's first down-conversion mixer or amplifier only during full-duplex operation. When the transmitter is inactive, the linearity of the mixer or amplifier can be reduced because spurious responses generated by the transmitter do not exist. They maximize battery life but still maintain adequate rejection of spurious third order receiver responses.

In view of the foregoing description it will be evident to a person skilled in the art that various modifications may be made within the scope of the invention. For example, the linearity may be increased by increasing the bias voltage for the non-linear device or the LO power input to a mixer. Additionally, the selectable resistance may be switchable between a resistance and a short circuit.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. Apparatus for inhibiting spurious responses in a receiver section of a transceiver, said receiver section having a non-linear device, said apparatus comprising:

detection means for detecting transmission of a RF signal from the transceiver and outputting a control signal indicative of said transmission; and linearity control means connected to said detection means and to the non-linear device so as to vary the linearity of said non-linear device in accordance with said control signal.

2. A transceiver comprising:

a transmitting means for transmitting a first RF frequency;

a receiving means for receiving a second RF frequency; and a duplexer coupled to the transmitting and receiving means so as to inhibit ingress of said first RF frequency into the receiving means, said receiving means including a non-linear device for operating on the second RF frequency, said non-linear device being adapted to provide greater linearity during transmission of said first RF frequency from the transmitting means.

3. Apparatus according to claim 1, wherein said linearity is varied by varying a bias current for said non-linear device in accordance with said control signal.

4. Apparatus according to claim 1, wherein said linearity is varied by varying a bias voltage for said non-linear device in accordance with said control signal.

5. Apparatus according to claim 1, wherein said linearity is varied by varying a drive power of a local oscillator signal for said non-linear device in accordance with said control signal.

6. Apparatus according to claim 3, wherein said linearity control means comprises a selectable resistance disposed in series with said bias current.

7. Apparatus according to claim 6, wherein said selectable resistance comprises a first resistor and a second resistor switchably coupled in parallel with said first resistor.

8. Apparatus according to claim 6, wherein said selectable resistance comprises a first resistor switchably coupled in parallel with a short circuit to ground.

9. A method for inhibiting spurious responses in a receiver for a transceiver, comprising the steps of:

detecting when signals are transmitted from said transceiver; and increasing the linearity of a non-linear device disposed in the receiver when signals are transmitted from said transceiver.

10. A method according to claim 9, wherein the bias current for the non-linear device is increased during transmission of signals from said transceiver.

11. A method according to claim 9, wherein a bias voltage for the non-linear device is increased during transmission of signals from said transceiver.

12. A method according to claim 9, wherein drive power of a local oscillator signal for the non-linear device is increased during transmission of signals from said transceiver.

13. A method according to claim 10, wherein the bias current is increased by reducing a resistance coupled in series with the bias current.

\* \* \* \* \*